Figure 1:
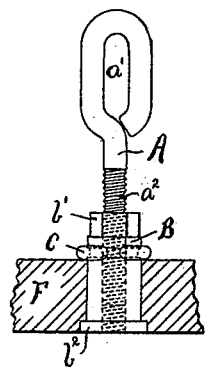

(No Model.)

J. F. McGRATH.
FULCRUM FOR THE WEIGHT LEVERS FOR THE ROLLS OF SPINNING FRAMES.

No. 419,611. Patented Jan. 14, 1890.

WITNESSES.
Elisha T Jackson
James B Crossman

INVENTOR.
John F. McGrath

UNITED STATES PATENT OFFICE.

JOHN F. McGRATH, OF TAUNTON, MASSACHUSETTS.

FULCRUM FOR THE WEIGHT-LEVERS FOR THE ROLLS OF SPINNING-FRAMES.

SPECIFICATION forming part of Letters Patent No. 419,611, dated January 14, 1890.

Application filed November 6, 1889. Serial No. 329,446. (No model.)

*To all whom it may concern:*

Be it known that I, JOHN F. McGRATH, a citizen of the United States, residing at Taunton, in the county of Bristol and State of Massachusetts, have invented an Improved Fulcrum for the Weight-Levers for the Rolls of Spinning-Frames; and I do hereby declare that the following is a full, clear, and exact description of the same, reference being had to the annexed drawings, making a part of this specification, and to the letters of reference marked thereon.

This invention has relation to that class of lever-screws which are employed for holding and adjusting weight-levers of the rolls of spinning-machines; and the object thereof is to provide a simple and cheap device for the same.

The novelty in the present instance resides in the peculiarities of construction and the combinations, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 2:
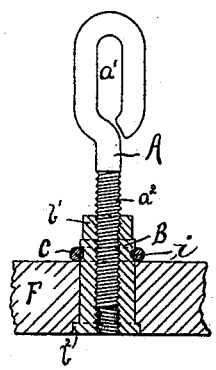
Figure 3:
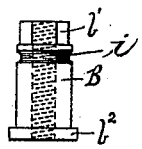
Figure 4:

Figure 1 is a side elevation showing the position of the screw in part of a frame, which is sectioned for greater convenience in showing parts. Fig. 2 is a side elevation of the screw, showing nut B in section. Fig. 3 shows nut B with the groove in the exterior of the nut. Fig. 4 shows collar C, which consists of a split ring.

Referring now to the details of the drawings by letter, $a$ designates the slot, formed to engage the hooked end of the weight-lever (not shown) in the usual manner. The wire portion or stem of the screw below the slotted portion is threaded, as at $a^2$, to engage or connect in the thread of nut B, said nut being threaded through the center to engage the thread $a^2$ of the stem, the nut B being set in the beam or frame F, and having a flange $b^2$ to keep the nut B from coming through, the nut being held by a collar or split ring C, so it can be turned to raise or lower the weight-lever. (Not shown.) Collar or split ring C is held on nut B by a circumferential groove $i$ on nut B, into which it fits, the nut being formed at its upper end with a polygonal portion $b'$, adapted to receive a wrench or other suitable tool by which it may be turned. The portion of the nut between the flange $b^2$ and the portion $b'$ is formed with a circumferential groove $i$, round or square, to receive the collar or split ring C, to keep the polygonal portion above the beam and the nut in place.

To secure the two parts together it is only necessary to place the nut in the beam or frame, spring on the collar or split ring, and turn the threaded and slotted wire to connect with the threaded nut. The threads of the two parts will lock with each other and prevent separation of the parts, and yet allow of free movement of the parts on each other, forming a threaded connection.

By the above construction I provide a cheap and simple device for the purpose set forth, which requires no special adaptation of the head of the nut other than forming the groove therein, as shown.

The parts may be readily put together or detached when desired.

The threaded and slotted wire bolt is made of wire of any metal, wrought-iron being preferred, and the slot is formed by bending the wire around a former made in the shape of the slot, the nut being made of cast-iron, preferably, making a very cheap article.

In other constructions of this class of devices there is considerable time, labor, and expense involved in tapping the beam or frame to connect the threaded shank. In this respect my construction offers a decided advantage over prior constructions, inasmuch as there is no tapping necessary in the beam, the latter being formed with a clearance-hole, which is countersunk or counterbored at the under side to allow the flange of the nut to have a true bearing, or it could be used without.

By my construction I can produce a better article—more readily put together, more satisfactory in results, and less liable to become separated—at less than one-half the cost of any prior construction.

What I claim is—

1. The combination of a nut having a polygonal portion and a flange to keep said nut in the beam, and exteriorly grooved as described, with a ring split so as to spring into the groove of said nut to keep the polygonal portion in position to be turned and a screw having a wire top portion formed with a slot and a stem or bottom portion formed with a thread, as shown and described.

2. The combination of a nut threaded through the center and provided with a flange with the screw formed with its upper portion slotted and held in the said nut, substantially as shown and described.

3. The combination of a nut having a polygonal portion, a flange below said portion, and a groove between the flange and polygonal portion with a collar or split ring formed with an opening, as shown, to engage and hold the same on said nut as is set forth and described.

JOHN F. McGRATH.

Witnesses:
ELISHA T. JACKSON,
JAMES B. CROSSMAN.